United States Patent
Sethi et al.

(10) Patent No.: US 9,372,743 B1
(45) Date of Patent: Jun. 21, 2016

(54) SYSTEM AND METHOD FOR STORAGE MANAGEMENT

(71) Applicant: EMC Corporation, Hopkinton, MA (US)

(72) Inventors: Pranit Sethi, Piscataway, NJ (US); Marc A. DeSouter, Wayne, NJ (US)

(73) Assignee: EMC Corporation, Hopkinton, MA (US)

( * ) Notice: Subject to any disclaimer, the term of this patent is extended or adjusted under 35 U.S.C. 154(b) by 261 days.

(21) Appl. No.: 14/042,326

(22) Filed: Sep. 30, 2013

(51) Int. Cl.
| G06F 11/00 | (2006.01) |
| G06F 11/07 | (2006.01) |
| G06F 11/14 | (2006.01) |

(52) U.S. Cl.
CPC ........ *G06F 11/0751* (2013.01); *G06F 11/0745* (2013.01); *G06F 11/0793* (2013.01); *G06F 11/1474* (2013.01)

(58) Field of Classification Search
CPC ............ G06F 11/0751; G06F 11/0793; G06F 11/0745; G06F 11/1471; G06F 11/1474; G06F 9/466
See application file for complete search history.

(56) References Cited

U.S. PATENT DOCUMENTS

| 5,201,044 A * | 4/1993 | Frey, Jr. ............... G06F 11/1471 714/16 |
| 6,873,184 B1 | 3/2005 | McMinn et al. |
| 7,039,661 B1 * | 5/2006 | Ranade ............. G06F 17/30575 707/610 |
| 7,631,009 B1 | 12/2009 | Patel et al. |
| 7,725,646 B2 | 5/2010 | Molotchko et al. |
| 8,037,033 B2 | 10/2011 | Cong et al. |
| 8,271,454 B2 | 9/2012 | Doty et al. |
| 8,452,929 B2 * | 5/2013 | Bennett ............... G06F 11/1441 711/156 |
| 8,977,898 B1 | 3/2015 | Veeraswamy et al. |
| 2004/0267835 A1 | 12/2004 | Zwelling et al. |
| 2008/0162591 A1 | 7/2008 | Ganotra |
| 2014/0310483 A1 | 10/2014 | Bennett |

OTHER PUBLICATIONS

Non-Final Office Action issued in related application U.S. Appl. No. 14/042,369 on Jul. 28, 2015, (11 pages).
Final Office Action issued in related U.S. Appl. No. 14/042,369 on Jan. 12, 2016.

* cited by examiner

*Primary Examiner* — Bryce Bonzo
*Assistant Examiner* — Anthony J Amoroso
(74) *Attorney, Agent, or Firm* — Brian J. Colandreo, Esq.; Mark H. Whittenberger, Esq.; Holland & Knight LLP

(57) ABSTRACT

A method, computer program product, and computing system for defining a transactional log file for a data storage system including defining a transactional log file for a data storage system including a data array. A plurality of IO requests for the data storage system are processed. The transactional log file is updated to include information concerning the plurality of IO requests, wherein the information includes an LGT indicator for each of the plurality of IO requests. The occurrence of a malfunction within the data storage system is sensed.

21 Claims, 5 Drawing Sheets

SYSTEM AND METHOD FOR STORAGE MANAGEMENT

This disclosure relates to storage systems and, more particularly, to systems and methods for managing storage processors.

BACKGROUND

Storing and safeguarding electronic content is of paramount importance in modern business. Accordingly, various systems may be employed to protect such electronic content. Further, in the event of a malfunction, such systems should be able to quickly restore themselves without any data loss.

SUMMARY OF DISCLOSURE

In one implementation, a computer-implemented method includes defining a transactional log file for a data storage system including defining a transactional log file for a data storage system including a data array. A plurality of IO requests for the data storage system are processed. The transactional log file is updated to include information concerning the plurality of IO requests, wherein the information includes an LGT indicator for each of the plurality of IO requests. The occurrence of a malfunction within the data storage system is sensed.

One or more of the following features may be included. Content associated with the plurality of IO requests may be written to the data array. The LGT indicator may define a last successful write to the transactional log file for each of the plurality of IO requests. Upon sensing the occurrence of the malfunction within the data storage system, the information concerning the plurality of IO requests may be processed to determine if the transactional log file has been corrupted. Determining if the transactional log file has been corrupted may include processing the transactional log file to identify a transmission failure portion within the transactional log file. Determining if the transactional log file has been corrupted may further include determining if any of the LGT indicators included within the transactional log file point to the transmission failure portion within the transactional log file. If any of the LGT indicators included within the transactional log file point to the transmission failure portion within the transactional log file, the transactional log file may be repaired. If none of the LGT indicators included within the transactional log file point to the transmission failure portion within the transactional log file, the transactional log file may be processed to update file system metadata, defined on the data array for the data storage system, to include the information concerning the plurality of IO requests included within the transactional log file.

In another implementation, a computer program product resides on a computer readable medium and has a plurality of instructions stored on it. When executed by a processor, the instructions cause the processor to perform operations including defining a transactional log file for a data storage system including a data array. A plurality of IO requests for the data storage system are processed. The transactional log file is updated to include information concerning the plurality of IO requests, wherein the information includes an LGT indicator for each of the plurality of IO requests. The occurrence of a malfunction within the data storage system is sensed.

One or more of the following features may be included. Content associated with the plurality of IO requests may be written to the data array. The LGT indicator may define a last successful write to the transactional log file for each of the plurality of IO requests. Upon sensing the occurrence of the malfunction within the data storage system, the information concerning the plurality of IO requests may be processed to determine if the transactional log file has been corrupted. Determining if the transactional log file has been corrupted may include processing the transactional log file to identify a transmission failure portion within the transactional log file. Determining if the transactional log file has been corrupted may further include determining if any of the LGT indicators included within the transactional log file point to the transmission failure portion within the transactional log file. If any of the LGT indicators included within the transactional log file point to the transmission failure portion within the transactional log file, the transactional log file may be repaired. If none of the LGT indicators included within the transactional log file point to the transmission failure portion within the transactional log file, the transactional log file may be processed to update file system metadata, defined on the data array for the data storage system, to include the information concerning the plurality of IO requests included within the transactional log file.

In another implementation, a computing system including a processor and memory is configured to perform operations including defining a transactional log file for a data storage system including a data array. A plurality of IO requests for the data storage system are processed. The transactional log file is updated to include information concerning the plurality of IO requests, wherein the information includes an LGT indicator for each of the plurality of IO requests. The occurrence of a malfunction within the data storage system is sensed.

One or more of the following features may be included. Content associated with the plurality of IO requests may be written to the data array. The LGT indicator may define a last successful write to the transactional log file for each of the plurality of IO requests. Upon sensing the occurrence of the malfunction within the data storage system, the information concerning the plurality of IO requests may be processed to determine if the transactional log file has been corrupted. Determining if the transactional log file has been corrupted may include processing the transactional log file to identify a transmission failure portion within the transactional log file. Determining if the transactional log file has been corrupted may further include determining if any of the LGT indicators included within the transactional log file point to the transmission failure portion within the transactional log file. If any of the LGT indicators included within the transactional log file point to the transmission failure portion within the transactional log file, the transactional log file may be repaired. If none of the LGT indicators included within the transactional log file point to the transmission failure portion within the transactional log file, the transactional log file may be processed to update file system metadata, defined on the data array for the data storage system, to include the information concerning the plurality of IO requests included within the transactional log file.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
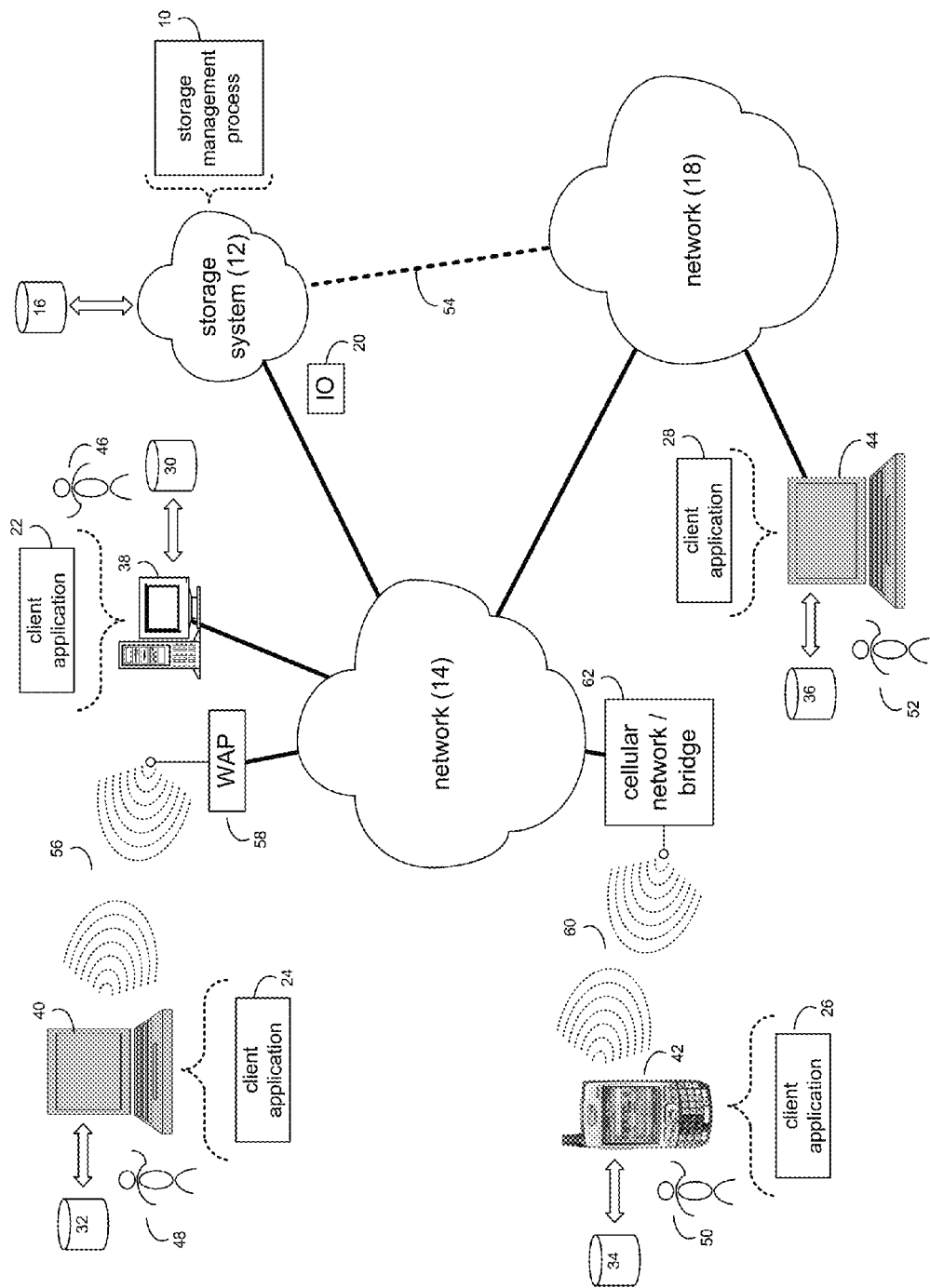
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
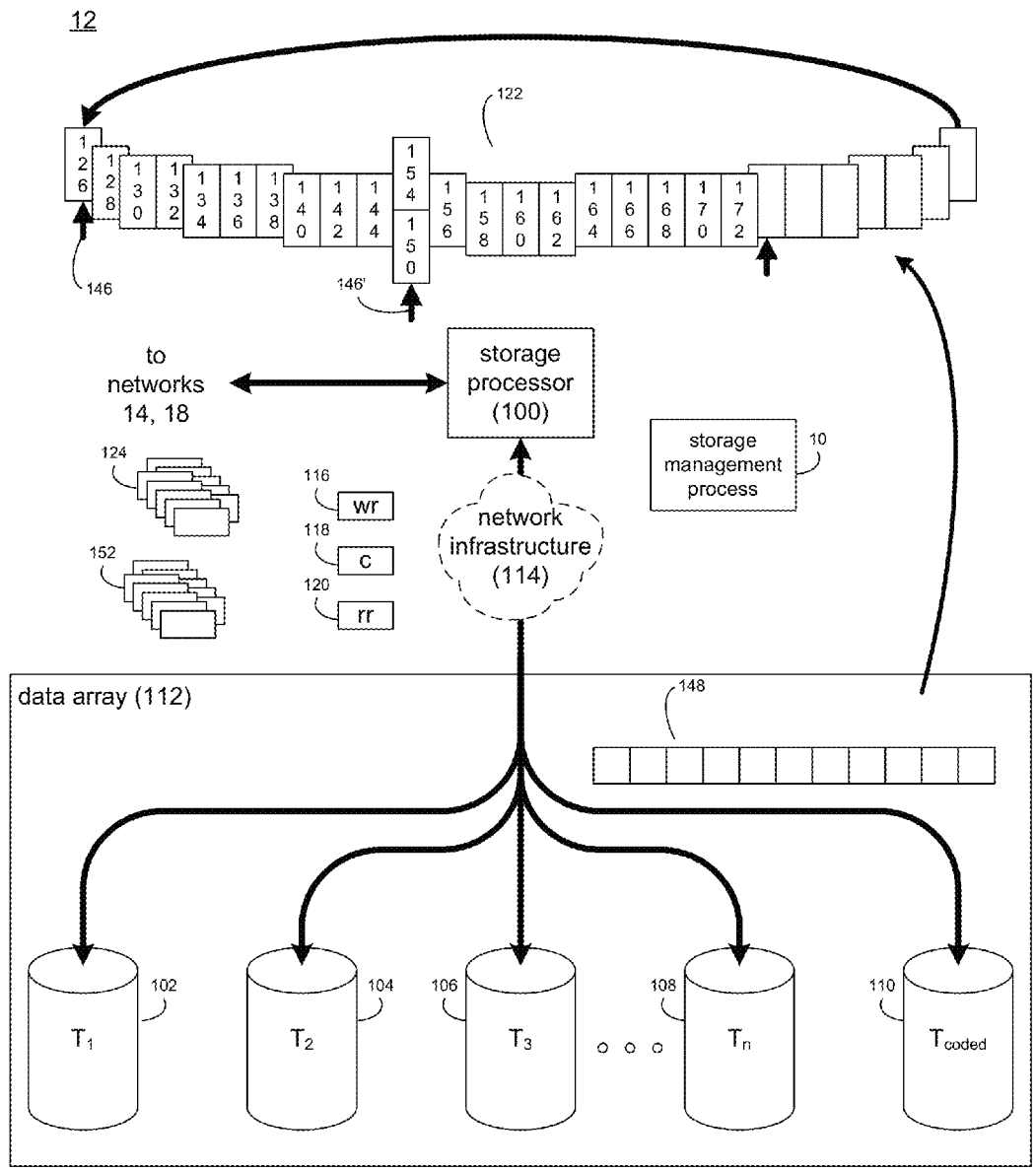
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By minoring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
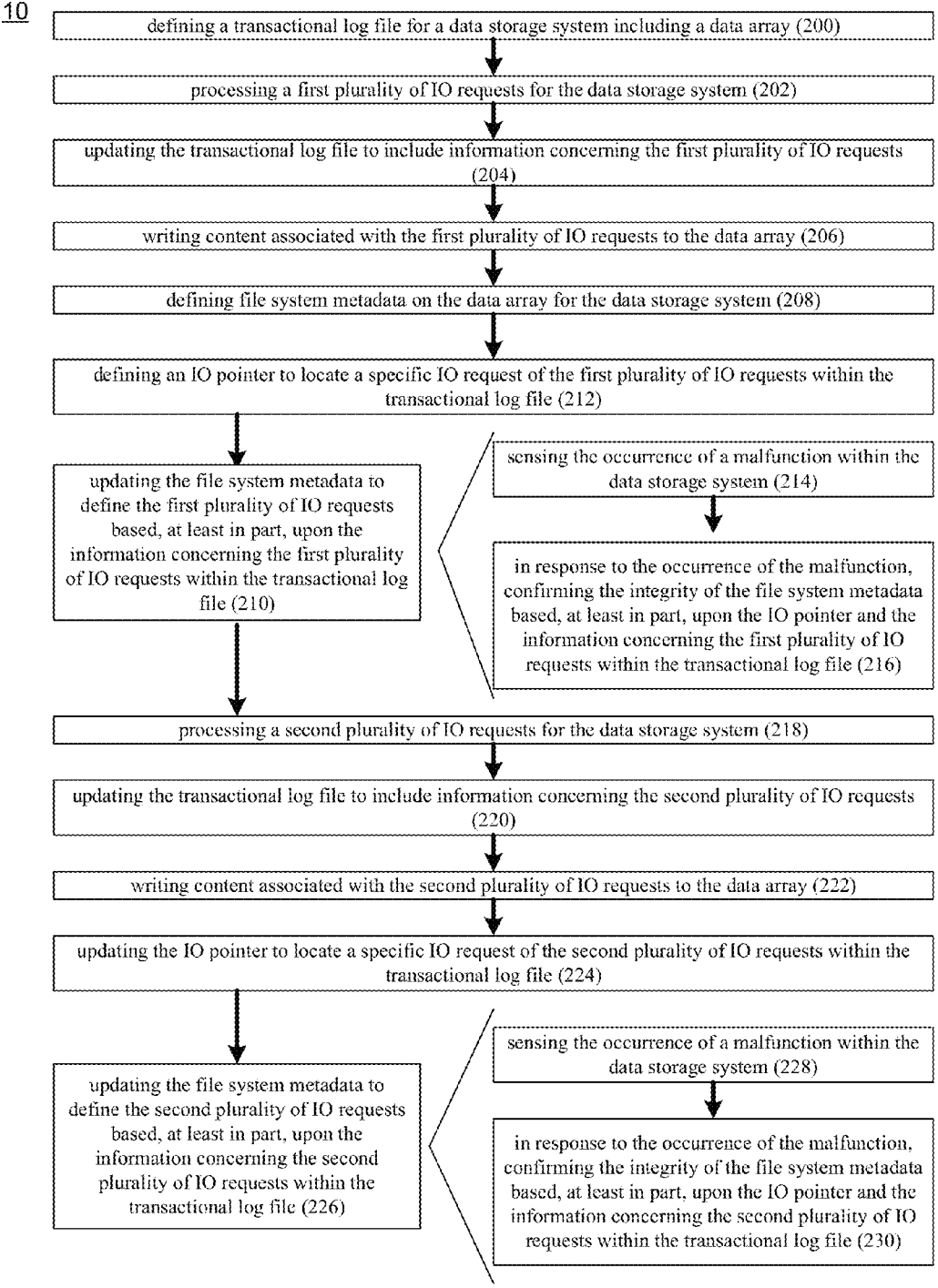
FIG. 3 is a first flow chart of one implementation of the storage management process of FIG. 1.

The Storage Management Process:

Referring also to FIG. 3, storage management process 10 may define 200 a transactional log file (e.g., transactional log file 122) for data storage system 12. Transactional log file 122 may be used configured to function as a journal and may be to track intrusive operations requested of data storage system 12. An intrusive operation may be any operation that results in the creation/modification of data on data storage system 12. Accordingly, data write request 116 (i.e. a request that content 118 be written to storage system 12) may be considered an intrusive operation; while data read request 120 (i.e. a request that content 118 be read from storage system 12) may not be considered an intrusive operation.

Transactional log file 122 may be considered a "circular" log file, in which data is sequentially written to the file and, once the file is full, the oldest data in log file 122 is overwritten with new data. While transactional log file 122 is shown to include twenty seven separate portions, this is for illustrative purposes and is not intended to be a limitation of this disclosure, as other configurations are possible and are considered to be within the scope of this disclosure. Specifically, transactional log file 122 may be configured as a continuous, non-segmented log file, wherein transactional log file 122 is shown to include a plurality of portions to aid in and simply the discussion of the operation of transactional log file 122. Transactional log file 122 may be configured to be indicative of intrusive operations (or a portion thereof) performed on storage system 12.

Assume that during the operation of storage system 12, read (i.e., non-intrusive) data requests and write (i.e., intrusive) data requests are received and processed by storage system 12. Since read data requests are non-intrusive, such non-intrusive data requests may not be logged within transactional log file 122. However, since write data requests are intrusive, such intrusive data requests may be logged within transactional log file 122.

During operation of storage system 12, storage management process 10 may process 202 a first plurality of IO requests 124 (e.g., ten intrusive requests) for data storage system 12. Storage management process 10 may update 204 transactional log file 122 to include information concerning first plurality of IO requests 124. Assume for illustrative purposes that the first plurality of IO requests includes ten intrusive requests and, therefore, storage management process 10 may update 204 transactional log file 122 to include information (e.g., information 126, 128, 130, 132, 134, 136, 138, 140, 142, 144) concerning each of these intrusive data requests.

As (in this example) each of these data requests is an intrusive data request, storage management process 10 may write 206 content associated with first plurality of IO requests 122 to data array 112. Accordingly, if the intrusive data request is a data request that writes new data, storage management process 10 may write 206 the new data to data array 12. If the intrusive data request is a data request that modifies existing data, storage management process 10 may first read the existing data from data array 112 and then write 206 the modified data to data array 12.

As discussed above, storage management process 10 may write 206 content associated with first plurality of IO requests 124 to data array 112. Once this write operation is completed, data array 112 may notify storage management process 10 of the same. Concerning each piece of information included within transactional log file 122, the information may include a timestamp for the content, attributes of the content, the location (e.g., block addresses) of the content within data array 112, permissions associated with the content, a unique transaction identifier, etc. Once the content associated with an IO request is written 206 to data array 112 and transactional log file 122 is updated 204 to include information concerning this IO request, storage management process 10 may notify the host associated with the IO request that the JO request has been processed.

Storage management process 10 may define 208 file system metadata (e.g., file system metadata 148) on data array 112 for data storage system 12. Storage management process 10 may update 210 file system metadata 148 to define first plurality of IO requests 124 based, at least in part, upon the information (e.g., information 126, 128, 130, 132, 134, 136, 138, 140, 142, 144) concerning first plurality of IO requests 124 included within transactional log file 122. Specifically, since transactional log file 122 may be considered a "circular" log file, in which data is sequentially written to the file and, once the file is full, the oldest data in log file 122 is overwritten with new data, transactional log file 122 is not designed to indefinitely store the information (e.g., information 126, 128, 130, 132, 134, 136, 138, 140, 142, 144) concerning first plurality of IO requests 124. Accordingly, storage management process 10 may use the information (e.g., information 126, 128, 130, 132, 134, 136, 138, 140, 142, 144) included within transactional log file 122 to update 210 file system metadata 148 to define first plurality of IO requests 124. Since these updates may be done in the background, storage management process 10 may notify the host associated with an IO request that the IO request has been processed prior to the information concerning this IO request being written to data array 112, as this information was already written to transactional log file 122.

As discussed above, transactional log file 122 may be considered a "circular" log file, in which data is sequentially written to the file and, once the file is full, the oldest data in log file 122 is overwritten with new data. Accordingly and due to the size of transactional log file 122, storage management process 10 may define 212 an IO pointer (e.g., IO pointer 146) to locate a specific IO request of the first plurality of IO requests within transactional log file 122. Specifically and periodically, storage management process 10 may define 212 an IO pointer (e.g., IO pointer 146) that points to the IO request currently being processed 202 by storage management process 10. For this example, assume that IO pointer 146 locates the first IO request included within first plurality of IO requests 124 by pointing to information 126 included within transactional log file 122, which is associated with this IO request. Further, assume that IO pointer 146 is reset by storage management process 10 periodically so that e.g., IO pointer 146 is always pointing to the IO request that is currently being processed (or was recently processed) by storage management process 10. For example, IO pointer 146 may be reset each time that ten additional pieces of information are written to transactional log file 122.

Through the use of IO pointer 146, transactional log file 122 does not need to be segmented (as it had in the past), thus avoiding the inefficiencies of using a segmented transactional log file 122 (e.g., wasted storage space within transactional log file 122 due to end-of-segment data padding). Assume for illustrative purposes that storage system 12 malfunctions.

Accordingly, since storage management process 10 may update 210 file system metadata 148 (to define an IO request) subsequent to storage management process 10 updating 204 transactional log file 122 (to define the IO request) and notifying the host associated with the IO request that the IO request has been processed; there may be a discrepancy between file system metadata 148 and transactional log file 122 in the event of a malfunction.

Accordingly and when updating 210 file system metadata 148 to define first plurality of IO requests 124; if storage management process 10 senses 214 the occurrence of a malfunction within data storage system 12, storage management process 10 may confirm 216 the integrity of file system metadata 148 based, at least in part, upon IO pointer 146 and the information (e.g., information 126, 128, 130, 132, 134, 136, 138, 140, 142, 144) concerning first plurality of IO requests 124 within transactional log file 122.

As discussed above, IO pointer 146 is reset by storage management process 10 periodically so that e.g., IO pointer 146 is always pointing to the IO request that is currently being processed (or was recently processed) by storage management process 10. Accordingly and when confirming 216 the integrity of file system metadata 148, storage management process 10 may utilize IO pointer 146 to locate information within transactional log file 122 that was written proximate the malfunction. In this example, IO pointer is reset every time ten pieces of information are written to transactional log file 122. Once the piece of information pointed to by IO pointer 146 is located within transactional log file 122, storage management process 10 may review the information (e.g., information 126, 128, 130, 132, 134, 136, 138, 140, 142, 144) pointed to (and subsequent to) the information pointed to.

As stated above, each piece of information may include a unique transaction identifier. These transaction identifiers may be assigned by storage management process 10 and may be incremented for each new piece of information written to transactional log file 142. Accordingly, when a piece of information is located within transactional log file 122 that has a numerically lower transaction identifier than the previous piece of information, that is indicative that the previous piece of information within transactional log file 122 corresponds to the last IO request processed by storage management process 10 prior to the malfunction.

For example, assume that information 142 has a transaction number of 10000, information 144 has a transaction number of 10001, and information 150 has a transaction number 8973. Accordingly, since the transaction number of information 150 is less than the transaction number of information 144, information 144 corresponds to the last IO request processed by storage management process 10 prior to the malfunction.

Since (and as described above) the content associated with the IO request related to information 144 was previously written 206 to data array 112, storage management process 10 may utilize information (up to and including 144) to update 210 file system metadata 148 (just in case the above-described malfunction occurred after transactional log file 122 was updated 204 to include information 144 but before file system metadata 148 was updated 210 to include information 144.

Continuing with the above-stated example, assume that storage management process 10 processes 218 a second plurality of IO requests (e.g., second plurality of IO requests 152) for data storage system 12. Storage management process 10 may update 220 transactional log file 122 to include information (e.g., information 154, 156, 158, 160, 162, 164, 166, 168, 170, 172) concerning second plurality of IO requests 152. Any information that was previously written to these locations within transactional log file 122 (including information 150) may be overwritten by storage management process 10.

As discussed above, storage management process 10 may write 222 content associated with second plurality of IO requests 152 to data array 112. Storage management process 10 may also update 224 IO pointer 146 (resulting in updated IO pointer 146') to locate a specific IO request of second plurality of IO requests 152 within transactional log file 122. For example, storage management process 10 may update 224 IO pointer 146 (resulting in updated IO pointer 146') to locate information 154 that (in this example) corresponds with the first IO request included within second plurality of IO requests 152.

Further, storage management process 10 may update 226 file system metadata 148 to define second plurality of IO requests 152 based, at least in part, upon the information (e.g., information 154, 156, 158, 160, 162, 164, 166, 168, 170, 172) concerning second plurality of IO requests 152 within transactional log file 122.

Accordingly and in the same manner as described above, when updating 226 file system metadata 148 to define second plurality of IO requests 152; if storage management process 10 senses 228 the occurrence of a malfunction within data storage system 12, storage management process 10 may confirm 230 the integrity of file system metadata 148 based, at least in part, upon updated IO pointer 146' and the information (e.g., information 154, 156, 158, 160, 162, 164, 166, 168, 170, 172) concerning second plurality of IO requests 152 within transactional log file 122. Additionally, information 126, 128, 130, 132, 134, 136, 138, 140, 142, 144 may still be active and may also be processed when updating 226 file system metadata 148 to reflect information 154, 156, 158, 160, 162, 164, 166, 168, 170, 172.

Figure 4:
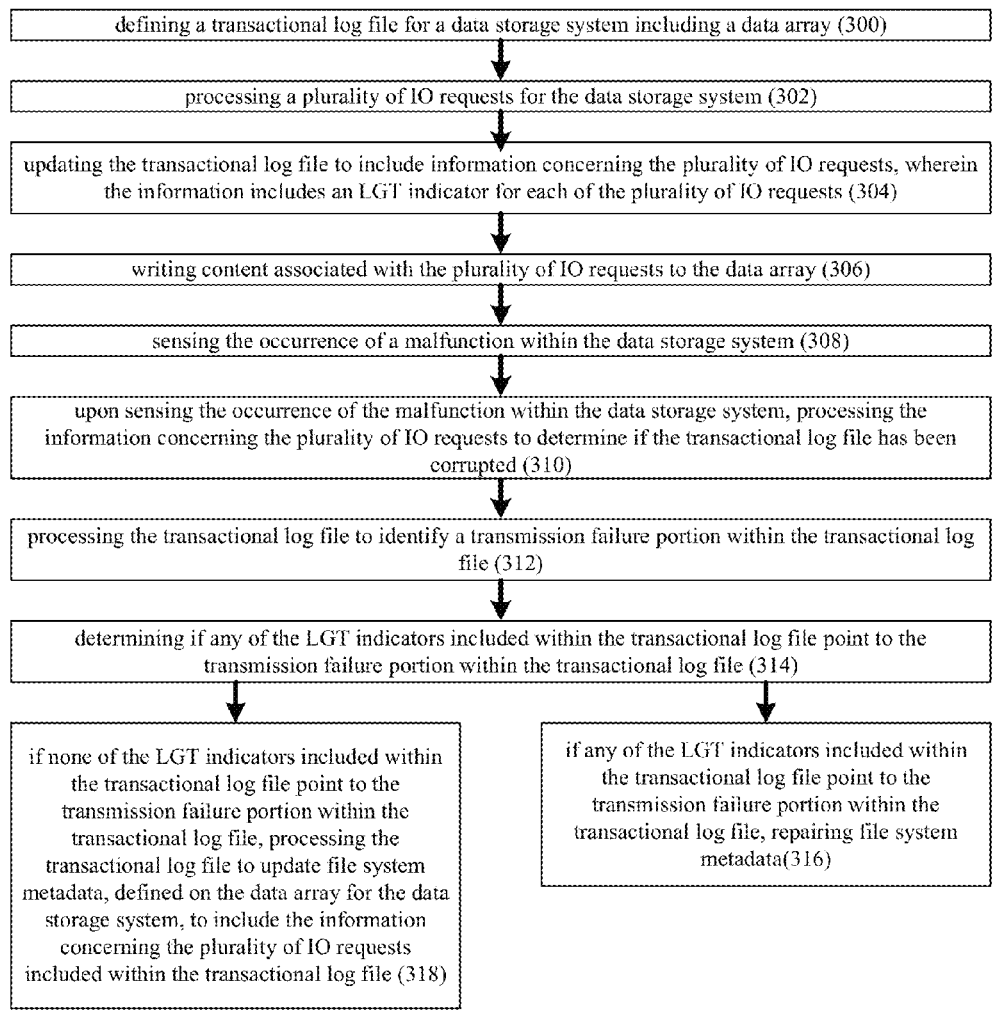
FIG. 4 is a second flow chart of one implementation of the storage management process of FIG. 1.
Figure 5:
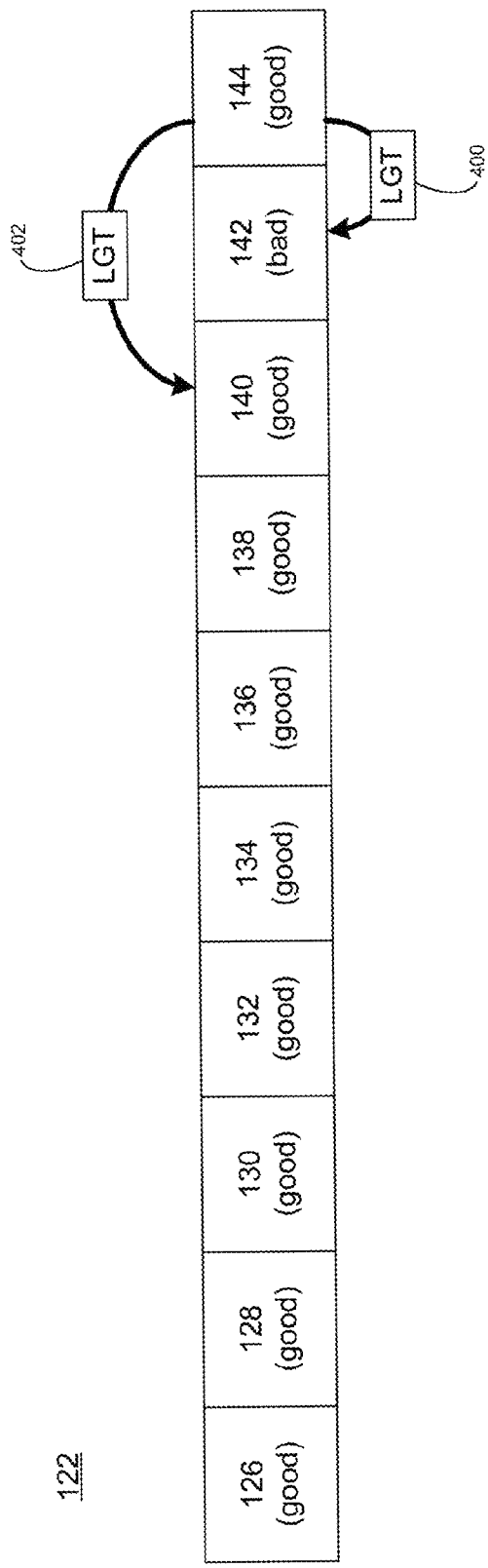
FIG. 5 is a diagrammatic view of a transactional log file generated by the storage management process of FIG. 1.

Referring also to FIGS. 4-5 and as discussed above, storage management process 10 may define 300 transactional log file 122 for data storage system 12 and may process 302 a plurality of IO requests (e.g., first plurality of IO requests 124) for data storage system 12.

Storage management process 10 may further update 304 transactional log file 122 to include information (e.g., information 126, 128, 130, 132, 134, 136, 138, 140, 142, 144) concerning first plurality of IO requests 124, wherein the information (e.g., information 126, 128, 130, 132, 134, 136, 138, 140, 142, 144) includes an LGT (i.e., Last Good Transaction) indicator for each of the plurality of IO requests (e.g., first plurality of IO requests 124). These LGT indicators may define a last successful write to transactional log file 122 for each of the plurality of IO requests (e.g., first plurality of IO requests 124). As discussed above, storage management process 10 may write 306 content associated with the plurality of IO requests (e.g., first plurality of IO requests 124) to data array 112.

Upon sensing 308 the occurrence of a malfunction within data storage system 12, storage management process 10 may process 310 the information (e.g., information 126, 128, 130, 132, 134, 136, 138, 140, 142, 144) concerning the plurality of IO requests (e.g., first plurality of IO requests 124) to determine if transactional log file 122 has been corrupted.

When determining if transactional log file 122 has been corrupted, storage management process 10 may process 312 transactional log file 122 to identify a transmission failure portion (e.g., information 142) within transactional log file 122. A transmission failure portion may occur when e.g., the above-described malfunction occurs when storage management process 10 is in the middle of writing a piece of information (e.g., information 126, 128, 130, 132, 134, 136, 138, 140, 142 or 144) to transactional log file 122. In this example assume that information 142 and information 144 concern the same IO request from first plurality of IO requests 124. Further assume that information 142 is larger than information 144. Accordingly, when storage management process 10 is updating 304 transactional log file 122 to include information 142, 144, transactional log file 122 may be updated 304 to include information 144 prior to transactional log file 122 being updated 304 to include information 142. Further assume that at this point in time, storage system 12 malfunctions, resulting in information 142 being a transmission failure portion.

When determining if transactional log file 122 has been corrupted, storage management process 10 may determine 314 if any of the LGT indicators included within transactional log file 122 point to the transmission failure portion (e.g., information 142) included within transactional log file 122. Accordingly, through the use of LGT indicators, the health (e.g., healthy vs. corrupted) of transactional log file 122 may be determined.

If any of the LGT indicators included within transactional log file 122 point to transmission failure portion (e.g., information 142) within transactional log file 122, storage management process 10 may repair 316 file system metadata 148. For example, if information 144 included LGT 400 that pointed to information 142, indicating that information 142 was the last good transaction, this may be indicative of file system metadata 148 being corrupted, as LGT 400 is identifying information 142 (which is a transmission failure indication) as being a good transaction. Accordingly, storage management process 10 may need to employ remedial data recovery procedures to repair 316 file system metadata 148, as file system metadata 148 has been corrupted.

Conversely, if none of the LGT indicators included within transactional log file 122 point to the transmission failure portion (e.g., information 142) within transactional log file 122, storage management process 10 may process 318 transactional log file 122 to update file system metadata 148 to include the information (e.g., information 126, 128, 130, 132, 134, 136, 138, 140, 142, 144) concerning the plurality of IO requests (e.g., first plurality of IO requests 124) included within transactional log file 122. For example, if information 144 included LGT 402 that pointed to information 140, indicating that information 140 was the last good transaction, this may be indicative of transactional log file 122 having not been corrupted, as LGT 402 is identifying information 140 (which is not a transmission failure indication) as being a good transaction. Accordingly, storage management process 10 may process 318 transactional log file 122 to update file system metadata 148 to include the information (e.g., information 126, 128, 130, 132, 134, 136, 138, 140, 142) concerning the plurality of IO requests (e.g., first plurality of IO requests 124) included within transactional log file 122 (in the manner described above)

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
defining a transactional log file for a data storage system including a data array, wherein the transactional log file is configured to be a non-segmented transactional log file;
processing a plurality of IO requests for the data storage system;
updating the transactional log file to include information concerning the plurality of IO requests, wherein the information includes a Last Good Transaction (LGT) indicator for each of the plurality of IO requests, wherein the LGT indicator includes a pointer in the transaction log file that points to an IQ request of the plurality of IO requests in the transaction log file corresponding to a last successful write to the transactional log file; and
sensing the occurrence of a malfunction within the data storage system.

2. The computer-implemented method of claim 1 further comprising:
writing content associated with the plurality of IO requests to the data array.

3. The computer-implemented method of claim 1 further comprising:
upon sensing the occurrence of the malfunction within the data storage system, processing the information concerning the plurality of IO requests to determine if the transactional log file has been corrupted.

4. The computer-implemented method of claim 3 wherein determining if the transactional log file has been corrupted includes:
processing the transactional log file to identify a transmission failure portion within the transactional log file.

5. The computer-implemented method of claim 4 wherein determining if the transactional log file has been corrupted further includes:
determining if any of the LGT indicators included within the transactional log file point to the transmission failure portion within the transactional log file.

6. The computer-implemented method of claim 5 further comprising:
if any of the LGT indicators included within the transactional log file point to the transmission failure portion within the transactional log file, repairing the transactional log file.

7. The computer-implemented method of claim 5 further comprising:
if none of the LGT indicators included within the transactional log file point to the transmission failure portion within the transactional log file, processing the transactional log file to update file system metadata, defined on the data array for the data storage system, to include the information concerning the plurality of IO requests included within the transactional log file.

8. A computer program product residing on a non-transitory computer readable medium having a plurality of instructions stored thereon which, when executed by a processor, cause the processor to perform operations comprising:
defining a transactional log file for a data storage system including a data array, wherein the transactional log file is configured to be a non-segmented transactional log file;
processing a plurality of IO requests for the data storage system;
updating the transactional log file to include information concerning the plurality of IO requests, wherein the information includes a Last Good Transaction (LGT) indicator for each of the plurality of IO requests, wherein the LGT indicator includes a pointer in the transaction log file that points to an IO request of the plurality of IO requests in the transaction log file corresponding to a last successful write to the transactional log file; and
sensing the occurrence of a malfunction within the data storage system.

9. The computer program product of claim 8 further comprising instructions for:
writing content associated with the plurality of IO requests to the data array.

10. The computer program product of claim 8 further comprising instructions for:
upon sensing the occurrence of the malfunction within the data storage system, processing the information concerning the plurality of IO requests to determine if the transactional log file has been corrupted.

11. The computer program product of claim 10 wherein the instructions for determining if the transactional log file has been corrupted include instructions for:
processing the transactional log file to identify a transmission failure portion within the transactional log file.

12. The computer program product of claim 11 wherein the instructions for determining if the transactional log file has been corrupted further include instructions for:
determining if any of the LGT indicators included within the transactional log file point to the transmission failure portion within the transactional log file.

13. The computer program product of claim 12 further comprising instructions for:
if any of the LGT indicators included within the transactional log file point to the transmission failure portion within the transactional log file, repairing the transactional log file.

14. The computer program product of claim 12 further comprising instructions for:
if none of the LGT indicators included within the transactional log file point to the transmission failure portion within the transactional log file, processing the transactional log file to update file system metadata, defined on the data array for the data storage system, to include the information concerning the plurality of IO requests included within the transactional log file.

15. A computing system including a processor and memory configured to perform operations comprising:
defining a transactional log file for a data storage system including a data array, wherein the transactional log file is configured to be a non-segmented transactional log file;
processing a plurality of IO requests for the data storage system;
updating the transactional log file to include information concerning the plurality of IO requests, wherein the information includes a Last Good Transaction (LGT) indicator for each of the plurality of IO requests, wherein the LGT indicator includes a pointer in the transaction log file that points to an IQ request of the plurality of IO requests in the transaction log file corresponding to a last successful write to the transactional log file; and
sensing the occurrence of a malfunction within the data storage system.

16. The computing system of claim 15 further configured to perform operations comprising:
writing content associated with the plurality of IO requests to the data array.

17. The computing system of claim 15 further configured to perform operations comprising:

upon sensing the occurrence of the malfunction within the data storage system, processing the information concerning the plurality of IO requests to determine if the transactional log file has been corrupted.

18. The computing system of claim 17 wherein determining if the transactional log file has been corrupted includes:
processing the transactional log file to identify a transmission failure portion within the transactional log file.

19. The computing system of claim 18 wherein determining if the transactional log file has been corrupted further includes:
determining if any of the LGT indicators included within the transactional log file point to the transmission failure portion within the transactional log file.

20. The computing system of claim 19 further configured to perform operations comprising:
if any of the LGT indicators included within the transactional log file point to the transmission failure portion within the transactional log file, repairing the transactional log file.

21. The computing system of claim 19 further configured to perform operations comprising:
if none of the LGT indicators included within the transactional log file point to the transmission failure portion within the transactional log file, processing the transactional log file to update file system metadata, defined on the data array for the data storage system, to include the information concerning the plurality of IO requests included within the transactional log file.

* * * * *